Jan. 24, 1950     A. J. PIDGEON     2,495,643
AIRCRAFT
Filed Aug. 30, 1946
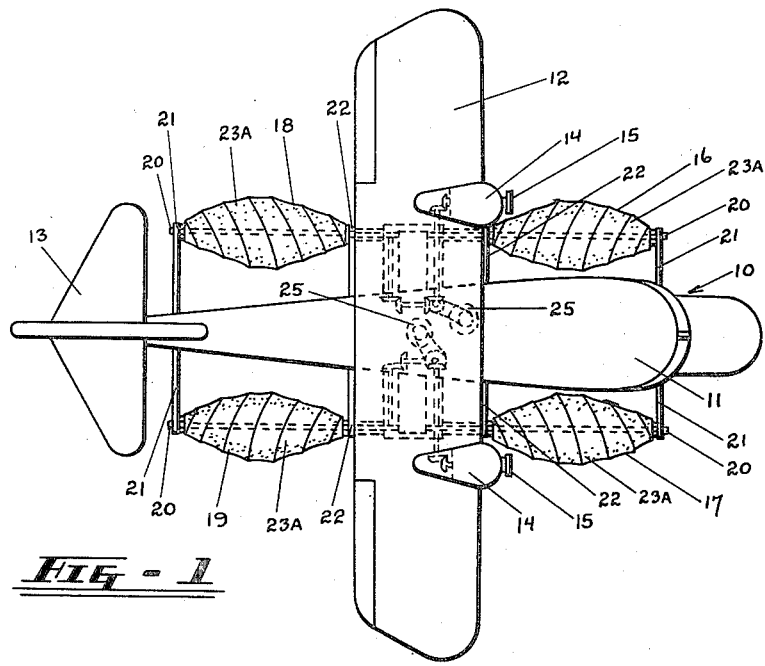
FIG - 1
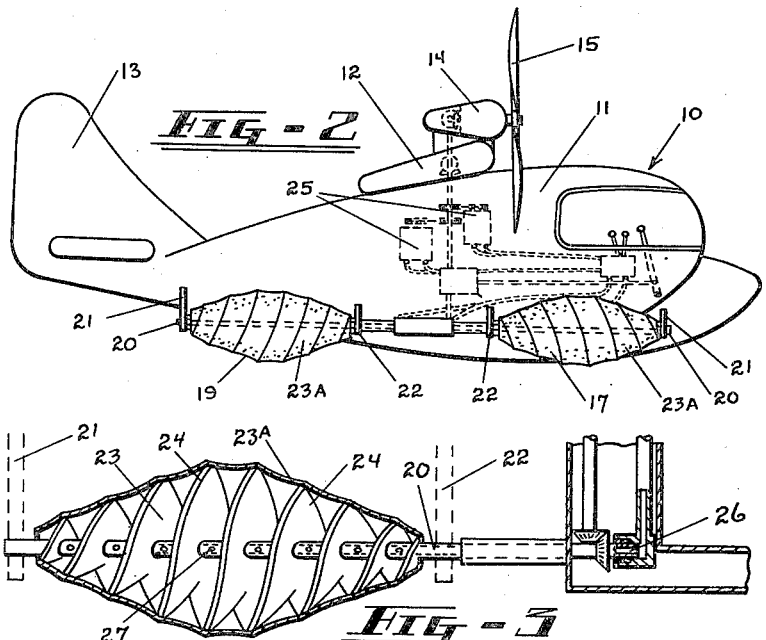
FIG - 2
FIG - 3
INVENTOR
Andrew James Pidgeon
by Edward N. Fetherstonhaugh
ATTORNEY Patented Jan. 24, 1950

2,495,643

UNITED STATES PATENT OFFICE 2,495,643

AIRCRAFT

Andrew James Pidgeon, Woodside Pidgeon Farm, Quebec, Canada

Application August 30, 1946, Serial No. 693,983

3 Claims. (Cl. 244—50)

The invention relates to improvements in aircraft as described in the present specification and illustrated in the accompanying drawings that form a part of the same.

The invention consists essentially of the novel features of construction as pointed out broadly and specifically in the claims for novelty following a description containing an explanation in detail of an acceptable form of the invention.

The objects of the invention are to provide aircraft with auxiliary pneumatic steering, balancing and propulsion means which will greatly facilitate control of the aircraft to devise an aircraft with pneumatic means which will minimize side slipping and such tendencies; to construct an aircraft with pneumatic means which will increase the buoyancy of same; to provide an aircraft with pneumatic means which will facilitate taking-off from a body of water; to devise an aircraft with pneumatic means which may be inflated or deflated to achieve varying results, to construct an aircraft with pneumatic means which will be simple and inexpensive to manufacture; to devise an aircraft with pneumatic means which will increase the safety of same; and generally to provide an aircraft with pneumatic means which will increase the maneuverability of same and be efficient for its purpose.

In the drawings:

Figure 1 is a plan view of the aircraft, which in this instance is illustrated as a flying boat.

Figure 2 is a side elevation of Figure 1.

Figure 3 is a part side sectional view taken through the pneumatic device.

Like numerals of reference indicate corresponding parts in the various figures.

Referring to the drawings, the invention, as hereinafter described and shown in the accompanying drawings is applied to a flying boat, but may be equally applied to other types of aircraft such as airplanes, monoplanes, seaplanes, passenger air-liners, freight air-liners and the like.

The flying-boat as indicated by the numeral 10 is provided with the conventional fuselage, 11, wings 12, rudders 13, motors 14 and propellers 15.

The pneumatic devices 16, 17, 18 and 19 each consist of a shaft 20 which is rotatably supported by means of the lateral support arms 21 and 22. These support arms are fixedly secured on the fuselage 11 so as to maintain the pneumatic devices substantially in position with respect to same. Each of the shafts 20 has a rotor 23 fixedly mounted thereon. This rotor 23 is similar in design to that of an auger or spiral in which a plurality of fins or ribs 24 are fixedly secured around the shaft 20 and at a definite pitch with respect to one another. The diametrical dimension of this spiral is larger at the central portion of same and gradually decreases in diameter towards each end thereof. The rotor 23 is covered with a flexible fabric 23-A which may be of a rubber composition or other stretchable material.

The shaft 20 of each rotor 23 is suitably connected to the motors 14 by means of shafts and bevel gears or any other suitable arrangement.

The pneumatic devices 16, 17, 18 and 19 are inflated by means of the air compressors 25 which are suitably connected to the motors 14.

These compressors 25 force air into the bore 26 in each shaft 20, and through the holes 27 which permit the air to enter the pneumatic devices and inflate same. A bushing or suitable valve may be employed in the end of each shaft 20 to permit inflation of these pneumatic devices while the same are in motion.

When the pneumatic devices are deflated the flexible fabric 23-A contracts and almost follows the contour of the spiral fins 24.

The pneumatic devices are adapted to be used either when inflated or deflated depending on the conditions and type of results required from same.

In the operation of the pneumatic devices 16, 17, 18 and 19 each are controlled individually so that they may be rotated in either direction at varying speeds when maneuvering the flying boat 10. These pneumatic devices are also adapted to suitably rotate so that each are pulling in the same direction.

In actual flight and in the take-off from water or a land base, the pneumatic devices 16, 17, 18 and 19 rotate, and at the same time, provide additional equilibrium with respect to the aircraft.

In taking off from a body of water these pneumatic devices rotate in the water, thus assisting the motors 14 in pulling and lifting the aircraft.

It will be seen from the foregoing that an aircraft has been designed that will have various advantages as to maneuverability in actual flight and in the take-off.

What I claim is:

1. In aircraft, a fuselage, wings, rudders, motors, propellers, pneumatic devices rotatably supported with respect to the said fuselage, said pneumatic devices each consisting of a shaft, a spiral formed by a plurality of fins fixedly secured around the said shaft and at a definite pitch with respect to one another, a flexible fabric covering each of the said pneumatic devices, and compressors adapted to inflate each of the said pneumatic devices.

2. In aircraft, a fuselage, wings, rudders, motors, propellers, pneumatic devices rotatably supported with respect to the said fuselage, said pneumatic devices each consisting of a shaft, a spiral formed by a plurality of fins fixedly secured around the said shaft and at a definite pitch with respect to one another, the diametrical dimension of said spiral being larger at the central portion of same and gradually decreasing in diameter towards each end thereof, a flexible fabric covering each of the said spirals, and compressors adapted to inflate said pneumatic devices.

3. In aircraft, a fuselage, wings, rudders, motors, propellers, pneumatic devices rotatably supported with respect to the said fuselage, said pneumatic devices each consisting of a shaft, a spiral formed by a plurality of fins fixedly secured around the said shaft and at a definite pitch with respect to one another, the diametrical dimension of said spiral being larger at the central portion of same and gradually decreasing in diameter towards each end thereof, a flexible fabric covering each of the said spirals, compressors suitably connected to the said shaft in each of the said pneumatic devices each of the said shafts having a bore in one end thereof and holes leading from the said bore, thus permitting the said pneumatic devices to be inflated by the same.

ANDREW JAMES PIDGEON.

REFERENCES CITED

The following references are of record in the file of this patent:

UNITED STATES PATENTS

| Number | Name | Date |
| --- | --- | --- |
| 1,575,680 | Giefer | Mar. 9, 1926 |
| 2,065,414 | Adams | Dec. 22, 1936 |
| 2,388,711 | Sawyer | Nov. 13, 1945 |

FOREIGN PATENTS

| Number | Country | Date |
| --- | --- | --- |
| 19,242 add'l to 466,439 | France | July 25, 1914 |